United States Patent [19]

Noll, Jr.

[11] Patent Number: 5,548,898
[45] Date of Patent: Aug. 27, 1996

[54] METHOD FOR PROVIDING A FLEXIBLE COVERING FOR A PORTION OF A TAPERED COIL SPRING

[75] Inventor: Robert A. Noll, Jr., Florence, Ky.

[73] Assignee: Hoesch Suspensions, Inc., Hamilton, Ohio

[21] Appl. No.: 235,424

[22] Filed: Apr. 29, 1994

Related U.S. Application Data

[62] Division of Ser. No. 944,517, Sep. 14, 1992, Pat. No. 5,310,167.

[51] Int. Cl.[6] .............................. B23P 11/02; B23P 13/00
[52] U.S. Cl. ........................... 29/896.91; 29/450; 29/235
[58] Field of Search ............................ 29/173, 450, 234, 29/235, 896.91; 267/33, 152, 166

[56] References Cited

U.S. PATENT DOCUMENTS

| | | |
|---|---|---|
| 161,386 | 3/1875 | Clooney . |
| 1,586,353 | 8/1921 | Colegrove . |
| 1,679,698 | 8/1928 | Weydert . |
| 2,005,089 | 6/1935 | Krebs . |
| 2,126,201 | 8/1938 | McCall . |
| 2,467,559 | 4/1949 | Mahlberg . |
| 2,605,099 | 4/1949 | Brown . |
| 2,766,806 | 10/1956 | Rothermel et al. . |
| 2,782,803 | 2/1957 | Rothermel et al. . |
| 2,822,165 | 2/1958 | Boschi . |
| 2,917,568 | 12/1959 | Moorman et al. . |
| 3,161,407 | 12/1964 | Robin . |
| 3,711,917 | 1/1973 | Baumgras . |
| 4,110,396 | 8/1978 | Reynolds . |
| 4,506,430 | 3/1985 | Guzay, Jr. .............................. 29/450 |
| 4,573,251 | 3/1986 | Hillyard .................................. 29/450 |
| 4,599,783 | 7/1986 | Ceccacci ................................. 29/450 |
| 4,753,423 | 6/1988 | Ukai et al. . |
| 4,763,882 | 8/1988 | Nishiyama et al. . |
| 4,869,471 | 9/1989 | Schwarz et al. . |

FOREIGN PATENT DOCUMENTS

| | | |
|---|---|---|
| 1091672 | 4/1955 | France . |
| 1253864 | 1/1961 | France . |
| 2620149 | 11/1977 | Germany . |
| 2813819 | 10/1979 | Germany . |
| 3737104 | 2/1987 | Germany . |
| 56-0020843 | 2/1981 | Japan . |
| 637707 | 5/1950 | United Kingdom . |

Primary Examiner—P. W. Echols
Attorney, Agent, or Firm—Frost & Jacobs

[57] ABSTRACT

A coil spring assembly is disclosed for use with motor vehicle suspension systems in which a portion of the wire coils of the coil spring is covered by a flexible hose or tube. Coil springs which could use such hoses include those having a tapered wire diameter wherein one end of the coil spring's wire has a smaller diameter than at other portions of its length. The flexible hose is made of a material which has sufficient resiliency to first be stretched as it is installed onto the wire of the coil spring, and then will naturally return back to near its original non-stressed diameter to tightly fit around the diameter of the wire at both ends of the hose. The resulting tight fit retains lubricant and anti-corrosive compounds inside the hose, and keeps moisture and dirt from entering the interior of the hose.

11 Claims, 4 Drawing Sheets

METHOD FOR PROVIDING A FLEXIBLE COVERING FOR A PORTION OF A TAPERED COIL SPRING

This is a divisional of application Ser. No. 07/944,517, filed Sep. 14, 1992, now U.S. Pat. No. 5,310,167.

TECHNICAL FIELD

The present invention relates generally to coil springs and associated assembly equipment, and is particularly directed to coil springs of the type which have a flexible tubular covering or the like assembled over a portion of such springs. The invention will be specifically disclosed in connection with coil springs which have a tapered wire diameter, and which are usable with automotive suspension systems.

BACKGROUND OF THE INVENTION

Compression springs having a helical or coiled shape are well known in the art, and have been used in suspension systems for motor vehicles and the like. The wire used to create the coil spring can be of constant, non-tapered diameter, or can be of tapered form having a smaller diameter at one end of the coil spring and a larger diameter at an intermediate portion. In many applications, such as motor vehicle suspension systems, it is desirable to place a tubular sleeve or hose over a portion of the coil spring having a tapered wire diameter. Such a hose or sleeve can reduce noise as the coils of the spring tend to bump against one another, and can, if properly applied, also protect that portion of the spring against corrosion.

U.S. Pat. No. 3,161,407 (Robin) discloses a coil spring having a sheath of resiliently deformable material covering the convolutions of the coil spring. This sheath can be formed with splines, corrugations, or other relief patterns on at least one of its faces, which will tend to function as a shock absorber as the coil spring deflects. U.S. Pat. No. 3,711,917 (Baumgras) discloses a coil spring which is encased in a coating of protective material, such as Teflon™. Baumgras discloses the use of a Teflon™ hose or tube which has a larger inner diameter than the coil spring wire's diameter, so as to leave an air gap between the Teflon™ and the spring wire as the Teflon™ is slipped onto the wire. After that has occurred, the entire assembly is heat-treated to shrink the Teflon™, thereby fitting tightly around the wire.

U.S. Pat. No. 4,763,882 (Nischiyama et al.) discloses a coil spring which has its wire coils coated with a soft resin foam, such as polyurethane foam. This coating is formed by placing the coil in a mold, then forcing expanding foam material into the mold. The disclosed purpose of this design is to prevent an increase in the dynamic spring constant, and to suppress surging of the spring.

U.S. Pat. No. 2,766,806 (Rothermel et al.) discloses a method for making corrugated flexible hoses. Rothermel '806 discloses the use of an outer layer of plastic which is reinforced by an inner coil spring. A differential air pressure is used to urge the plastic (while in a plastic flow state) down onto the mandrel used during assembly, thereby forming corrugations. Another Rothermel patent, U.S. Pat. No. 2,782,803, discloses the use of a flexible conduit having a reinforced interior, in which the reinforcement material is a helical spring which is coated with plastic. Rothermel '803 discloses an assembly procedure such that, after the helical spring is installed inside the tubular sheath, the entire assembly is heated in a chamber. Again, air pressure or a vacuum is used to create the corrugations. In both Rothermel patents, the wires of the coil spring appear to be non-tapered (i.e., having a constant diameter).

Rothermel '806 also discloses the use of a vacuum forming tube to assist in the assembly of the outer cover tube over the outer cylindrical diameter of the coil spring. Alternatively, Rothermel '806 discloses the use of "blowing" the cover tube over the cylindrical coil spring as the coil spring sits on a mandrel.

U.S. Pat. No. 4,869,471 (Schwarz et al.) discloses the use of a tapered hose for covering a portion of the tapered wire of a progressive characteristic helical compression spring. This tapered hose is manufactured by using a drawing mechanism having precise speed control so that the hose can emerge from an extruder at varying speed, thereby creating the tapered diameter. As an alternative, Schwarz et al. disclose a method for manufacturing the tapered hose by keeping the speed of the drawing mechanism at a constant, and varying the rate of extrusion. In both cases, the hose is formed having a varying diameter, in which the diameter at one end is smaller than at the opposite end (thereby forming a "tapered" hose).

Schwarz et al. disclose a preferred hose having a wall thickness of approximately one millimeter, and made from a thermoplastic polyurethane compound. An example of such hose is disclosed having a larger inside diameter of about 12.1 mm, and tapering down to a smaller inside diameter of 9.6 mm at its opposite end. This tapered hose is to be drawn over the tapered wire of a helical compression spring. Schwarz et al. also disclose that the hose material is to be made of an elastic material that readily recovers its shape, such that the hose ultimately will rest tightly against the wire of the coil spring, thereby allegedly ensuring that any anti-corrosion agent and lubricant inside the hose will not leak out, and that moisture and dirt outside the hose will not penetrate in.

Unfortunately, Schwarz et al. do not disclose the fact that its preferred material, polyurethane, does not have sufficient resiliency to perform the functions required. It has been observed that in actual use, the polyurethane material preferred in Schwarz et al. will not seal tightly around the wire of the coiled spring once it has been run up that spring. In fact, the ends of such a hose will be permanently deformed by the stress of being run up the coiled wire of the spring (i.e, from the successive bending around the coils) and will form air gaps between the inner diameter of the hose and the diameter of the spring wire at both ends of the polyurethane hose.

Because of these air gaps, the polyurethane hose preferred in Schwarz et al. must be sealed by a compound after it has been installed onto the wire of the coil spring. Otherwise, corrosion and dirt will enter the interior portions of this polyurethane hose, and lubricating and anti-corrosive compound will tend to leak out.

In addition, it is significantly more expensive to manufacture tapered hoses such as those disclosed in Schwarz et al. than non-tapered hoses. It is also more expensive to manufacture pre-cut hoses which are cut-to-length at the hose manufacturing facility (before shipment to a coil spring manufacturing facility for final assembly) than to manufacture one long section of hose, which can be shipped from the hose manufacturing facility on a large reel.

SUMMARY OF THE INVENTION

Accordingly it is a primary object of the present invention to provide a non-tapered hose which can be placed upon either tapered or non-tapered wire of a helical coil spring, and which is made of a material which has sufficient resiliency so as to fit tightly around the diameter of the wire of the coil spring once installed, in order to keep out moisture and other corrosive agents from the interior of the hose.

It is another object of the present invention to provide a method for assembling a non-tapered hose upon a portion of the wire of a helical coil spring which will not require the use of a sealant compound applied at the ends of a hose once it is assembled upon the spring.

It is a further object of the present invention to provide a method of assembling a non-tapered hose onto a portion of the wire of a helical coil spring in which compressed air is used to assist in running the hose up the diameter of the wire of the coil spring.

It is yet another object of the present invention to provide a method of automatically assembling a non-tapered hose onto a portion of the wire of a helical coil spring in which compressed air is used to assist in running the hose up the diameter of the wire of the coil spring.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved coil spring assembly is provided wherein a portion of the wire of the coil spring is partially covered by a hose. The hose, before assembly, is non-tapered in form, and has sufficient resiliency such that, once it has been placed over the wire of the coil spring, the hose will tightly seal around the diameter of that coil spring wire at both ends of the hose. This tight seal occurs whether the coil spring's wire is tapered or non-tapered.

A method for assembling this hose onto the coil spring wire is also provided, in which air pressure is used to assist in running the hose up the diameter of the wire of the coil spring. An automatic method of such assembly is also provided in which the use of manual labor is kept to a minimum.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 1A is a fractional elevational view of the hose used in the assembly of FIG. 1 before that hose has been assembled onto the coil spring.

FIG. 2A is a fractional elevational view of the tapered hose used in FIG. 2 before that hose has been placed on the coil spring assembly.

FIG. 2B is a cross-sectional view of the coil spring assembly of FIG. 2, taken at the section lines 2B—2B.

FIG. 3A is a cross-sectional view of the air fitting illustrated in FIG. 3 for holding one end of the hose in place, as the hose is assembled onto the coil spring.

DETAILED DESCRIPTION OF THE INVENTION

Reference will now be made in detail to the present preferred embodiment of the invention, an example of which is illustrated in the accompanying drawings, wherein like numerals indicate the same elements throughout the views.

Figure 1:
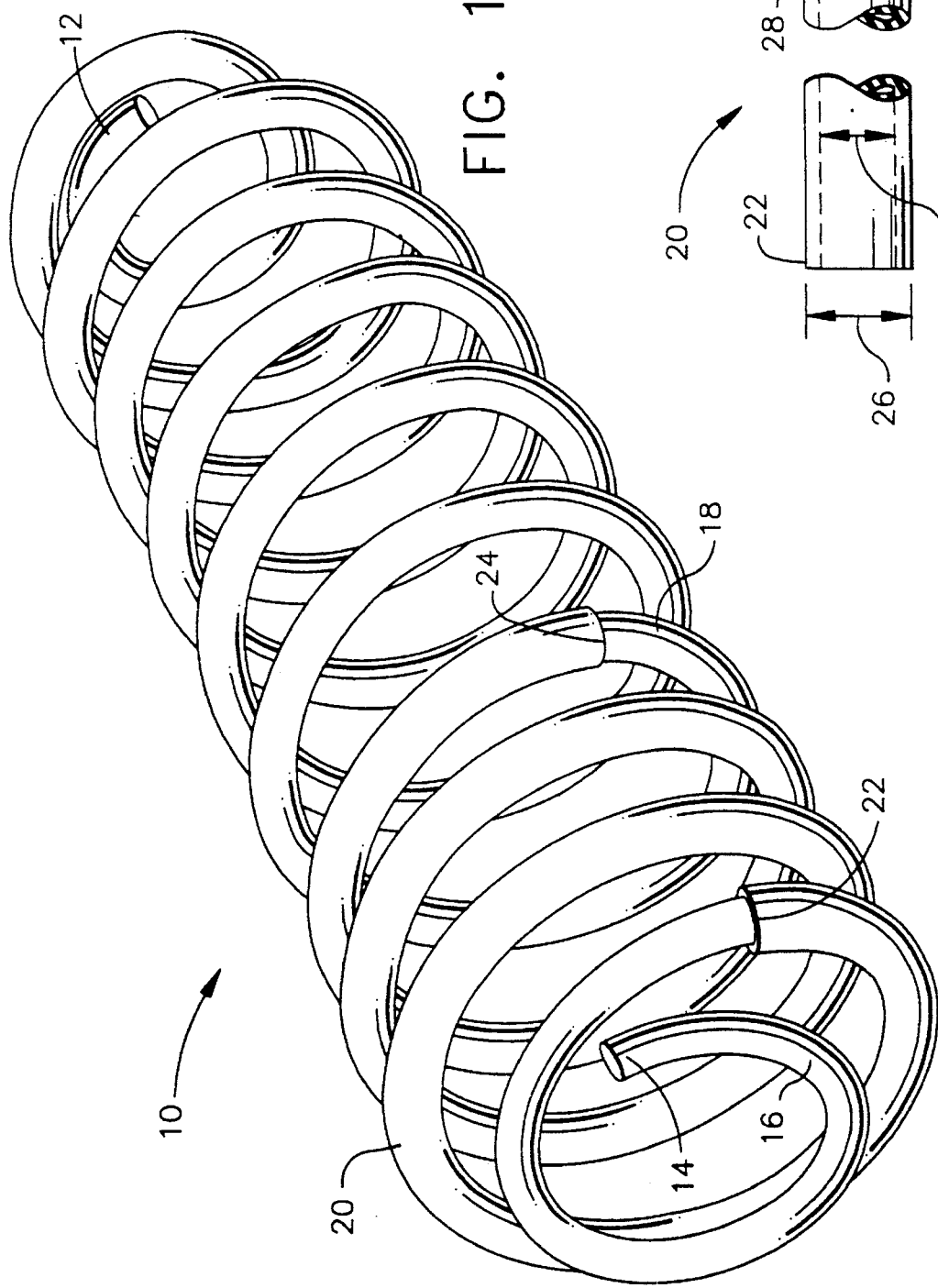
FIG. 1 is a partial perspective view of a coil spring assembly constructed according to the principles of the present invention, and illustrating a hose covering a portion of the coil spring near its tapered end.

Referring now to the drawings, FIG. 1 shows a spring assembly, generally designated by the numeral 10, which comprises a coil spring 12 and a hose or similar sleeve-like or tubular cover 20 (hereinafter all such structures will be collectively referred to as a "hose") which covers a portion of coil spring 12. The wire which comprises coil spring 12 can have a constant diameter, or it can be tapered such that one end of coil spring 12 is smaller in diameter than the other end. Coil spring 12, as depicted in FIG. 1, comprises a tapered wire which has a smaller diameter portion, designated at the location 16, and a larger diameter portion, at the location generally designated 18. The tapered end 14 of the wire of spring 12 has a smaller diameter, and is the end which is used to install hose 20.

It will be understood that coil spring 12 could be tapered on both ends, in which the diameter at tapered end 14 is smaller than at a mid-portion of the spring wire and the diameter at the far end (not indexed) is also smaller in diameter than the mid-portion. The mid-portion of the spring wire could be at, for example, the location designated by the numeral 24.

Referring to FIG. 1A, hose 20 is depicted in its non-stressed form after hose 20 has been cut-to-length for use in covering a portion of coil spring 12. As can be seen in FIG. 1A, hose 20 preferably has a substantially constant outer diameter 26 and a substantially constant inner diameter 28. Consequently, the wall thickness of hose 20 is also of substantially constant thickness.

After hose 20 has been fully pushed onto the tapered end 14 of spring 12 (as seen in FIG. 1), the hose 20 contracts due to its high resiliency and snugly fits over the diameter of the wire of coil spring 12. Since coil spring 12 itself is tapered, the form of hose 20 also now becomes tapered because of its resilient snug fit around the diameter of coil spring 12. After this assembly has occurred, hose 20 has an end 22 which has a smaller diameter than its opposite end 24. As related above, however, hose 20, in its non-stressed form (as depicted in FIG. 1A) has a constant diameter at both ends 22 and 24.

Figure 2:
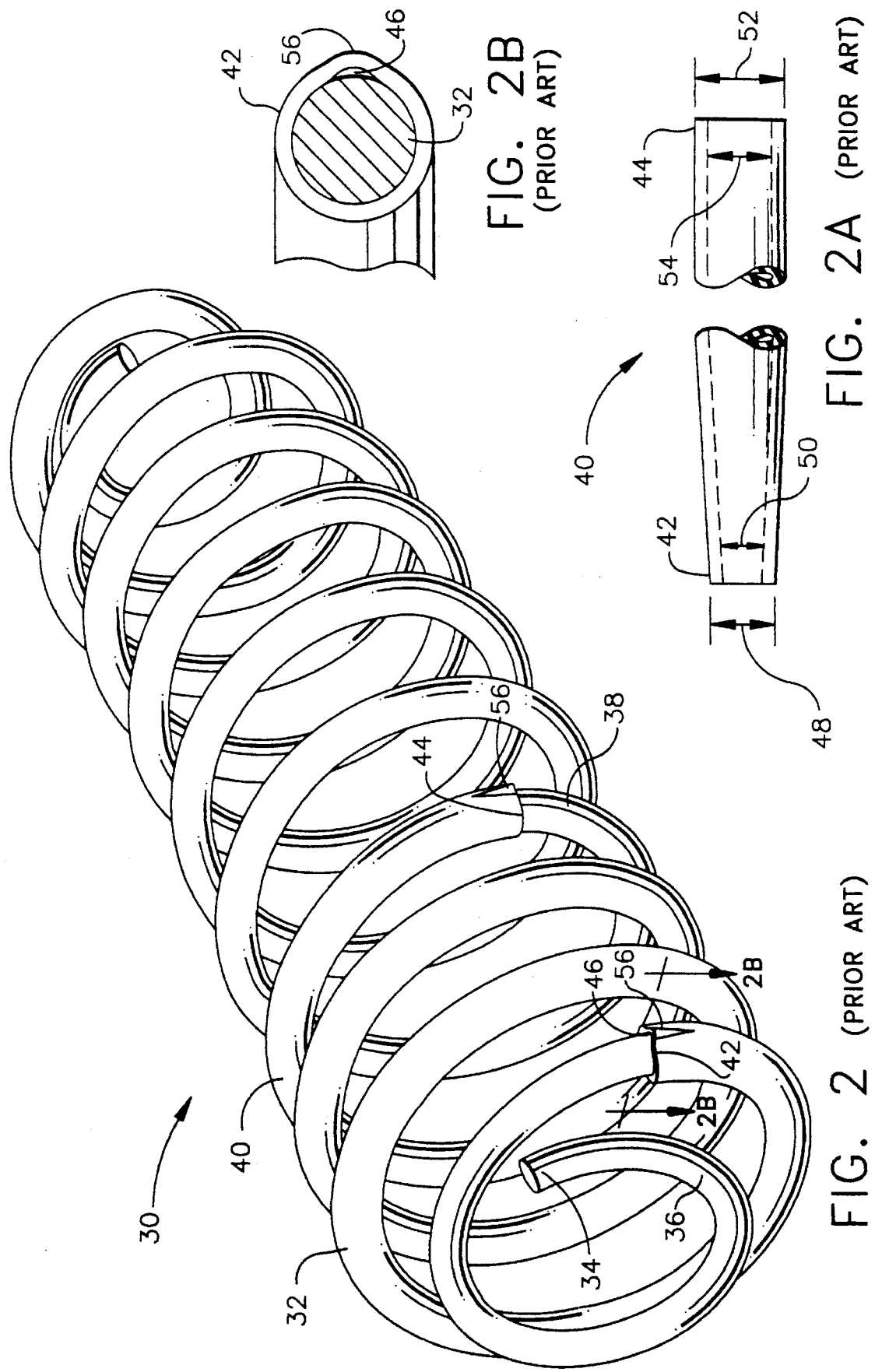
FIG. 2 is a partial perspective view of a coil spring assembly known in the prior art which uses a tapered hose to cover a portion of the coiled spring near its tapered end.

FIG. 2 depicts a spring assembly known in the prior art, generally designated by the numeral 30. Spring assembly 30 consists of a coil spring 32 formed of a wire that is tapered on one end 34. The diameter of the wire which makes up coil spring 32 is smaller at the location designated by the numeral 36 than the diameter of that same wire at the location designated by the numeral 38. A portion of coil spring 32 is covered by a hose 40 near the coil spring's tapered end 34.

As best seen in FIG. 2A, hose 40 is tapered, inasmuch as its end 42 has a smaller diameter than its opposite end 44 in its non-stressed form. Hose 40 is previously cut-to-length as it is manufactured (e.g., according to the Schwarz et al. patent), and is more expensive to manufacture than a non-tapered hose. As can be seen in FIG. 2A, the hose outer diameter 48 at its tapered end 42 is smaller than the outer diameter 52 at its opposite end 44. The same is true for the inner diameter, such inner diameter 50 being smaller at the tapered end 42 than the inner diameter 54 at its opposite end.

In FIG. 2, it can be seen that the hose end 44 having the larger diameter is run farther up coil spring 32 than the hose end 42 having a smaller diameter. Since hose 40 is tapered, it should more tightly fit around the diameter of the tapered coil spring 32. However, the polyurethane material generally used in hose 40 of the prior art does not have sufficient resiliency to tightly fit around the diameter of coil spring 32 at the hose ends 42 and 44. In fact, because of this lack of resiliency, air gaps 46 (as best seen in FIGS. 2 and 2B) are formed between the hose ends 42 and 44 and the diameter of the wire of coil spring 32.

Air gaps 46 result from "damage" to the polyurethane material of hose 40 during the assembly process, such that cusps or apexes are formed at locations designated by the numeral 56. Such protruding cusps or apexes are formed due to the stretching of the hose material as it is pulled over the wire coils of coil spring 32, and because the resilient limit of this material is exceeded as it is over-stressed during that process. Since these air gaps 46 exist at the ends 42 and 44 of hose 40, a sealant is often applied to ends 42 and 44 in order to keep out moisture and other corrosive materials from entering the spaces between hose 40 and the wire of coil spring 32. One sealant presently used in the prior art is known as Tectyl™, which is a lubricant and sealant manufactured by the Ashland Oil Company.

In contrast, the spring assembly 10 of the present invention provides a tight seal at the ends of hose 20 (i.e, at ends 22 and 24), as a result of the great resiliency of the material used in hose 20. The resiliency for rubber-type materials is normally expressed in terms of an ASTM standard testing procedure which determines such a material's "tension set." The tension set of a material, using the ASTM standard, is determined by the following procedure:

(1) Stretch the material until it reaches 200% of its normal size (for a hose, expand the inner diameter until it equals twice the non-stressed inner diameter), and hold, while applying this force, for three (3) minutes.

(2) Release the force so as to allow the material to relax and attempt to return to its original size.

(3) Wait one (1) minute, and measure the material's dimensions to determine the percent expansion as compared to its original non-stressed size (for a hose, measure the inner diameter again).

(4) The percent increase in size is the material's tension set specification.

Certain materials (such as polyurethane) cannot be stretched by 200% without permanent deformation. Other materials will contract when allowed to relax, and their tension set may be very low, perhaps near 1% to 2%. For the remainder of this disclosure, the resiliency or tension set of the hose materials will be generally characterized as the "resiliency" of such materials.

A preferred material for hose 20 is manufactured by the Kirkhill Rubber Company of Brea, Calif., and is sold under the compound number 380C3366. This compound is a rubber-like Carboxylated Acrylonitrile Butadiene polymer, and has certain urethane-type properties, but has a much greater resiliency than polyurethane. For example, the Carboxylated Acrylonitrile Butadiene polymer used in the present invention may be expanded more than 200% of its non-stressed inner diameter without exceeding its resilient limit, and it will contract to approximately 2% of its original size when undergoing the above-described ASTM testing procedure. On the other hand, a polyurethane hose would be permanently deformed if one attempted to expand it to 200% of its non-stressed inner diameter.

Other materials which may be used for hose 20 include Buna N and Nitrile, and have the general ASTM Designation "NBR". The acrylonitrile content of such materials is very important, for resilience increases as the percentage of acrylonitrile decreases.

Since hose 20 is non-tapered, it can be provided to the spring manufacturer as a continuous roll, and then cut to the proper length just before assembly onto coil spring 12. As an alternative, the non-tapered hose 20 could also be provided from the hose manufacturer already cut-to-length. Since hose 20 has such high resilience, it can be used on tapered wires of coil springs which have a more dramatic (or severe) increase in diameter than has been practiced in the prior art. For example, in Schwarz et al. the smaller inside diameter of the hose was 9.6 mm, and the larger inside diameter of that same hose was 12.1 mm (for a tapered hose). This tapered hose was to be used on a helical compression spring having a progressive diameter starting at 11.0 mm at its smaller end, and increasing to a maximum diameter of 13.5 mm.

In contrast, hose 20 of the present invention could have, for example, an inner diameter of 8.5 mm, and could be applied onto a tapered wire coil spring having its smallest diameter of 10.0 mm, and its largest diameter of 18.0 mm. Hose 20 would then fit tightly around the diameter of the coil spring at both ends 22 and 24. As an extra precaution, a sealant could be applied to both ends 22 and 24 of hose 20 after hose 20 has been assembled onto coil spring 12. While such a sealant would normally not be necessary, it may be desirable in certain high pressure or high spray applications.

Figure 3:
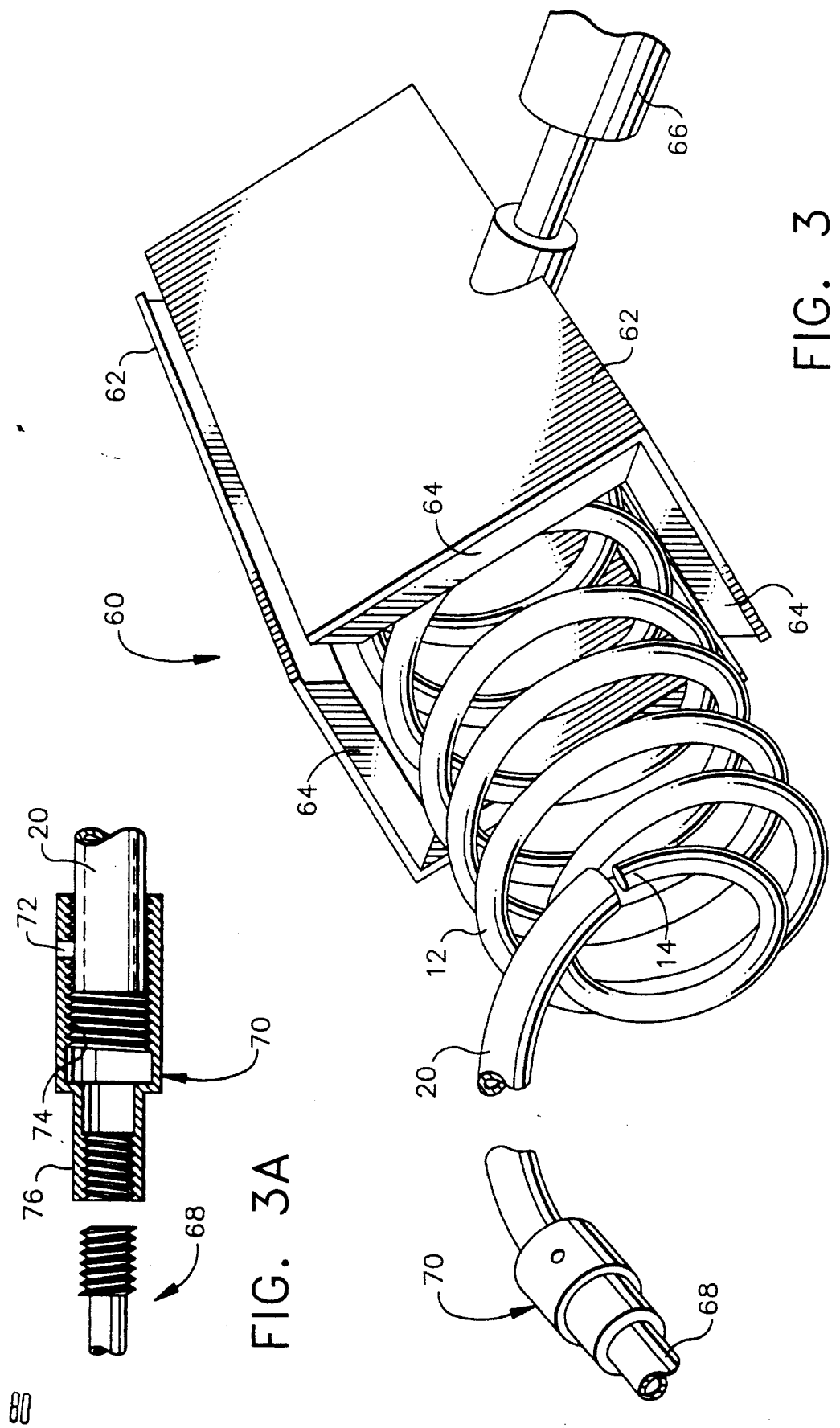
FIG. 3 is a perspective view of the coil spring assembly of FIG. 1 as it might be mounted in an assembly fixture, as the hose is about to be placed onto the coil spring.

FIG. 3 depicts an exemplary assembly fixture 60 on which a hose 20 can be manually installed upon a coil spring 12. Assembly fixture 60 includes two outer half-covers 62, each of which have a relatively thick rubber lining 64 arranged along their longitudinal interior walls. A coil spring 12 is placed inside the rubber linings 64, and then an air cylinder 66 is activated to close the outer half-covers 62 together so as to tightly surround a portion of the coil spring 12 with the rubber linings 64. A second, accessible portion of coil spring 12 is held in place by assembly fixture 60 while the hose 20 is installed onto that accessible portion. A lubricant is preferably sprayed on the accessible surfaces of coil spring 12, and also sprayed along the inside of hose 20 from both ends before it is assembled onto coil spring 12. A preferred lubricant for this purpose is available from Radiator Specialty Company of Charlotte, N.C., and is a silicone lubricant known by the trade name Solder Seal™.

Once air cylinder 66 is actuated, spring 12 is snugly held by the rubber linings 64 such that coil spring 12 cannot be twisted as hose 20 is installed. Rubber linings 64 also serve to protect the surface of coil spring 12 from damage during this assembly process.

One end of hose 20 is connected to a pressurized air line 68 preferably via a special air fitting 70. As can be best viewed in FIG. 3A, hose 20 is inserted inside a portion of air fitting 70 such that the internal threads designated by the numeral 74 tend to clamp against the outer diameter of air hose 20 once the air pressure is increased. The increase in air pressure tends to inflate hose 20 and expand its outer diameter against threads 74, and also against a small hole or holes 72 in the wall of air fitting 70. Hole 72 is preferably about two (2) mm in diameter. A second threaded portion 76 mates with air line 68, thereby enabling air pressure to be supplied to the inside portions of hose 20. When that air pressure is supplied, preferably at twenty (20) psi, the overall diameter of hose 20 tends to expand, and tends to press tightly against the threaded portion 74, thus keeping hose 20 in position inside air fitting 70.

It will be understood that air line 68 could be connected to a pressure source other than air pressure. For example, some other gaseous material could be used having either inert or lubricating qualities which would be more suitable for use in installing hoses of certain materials onto coil springs. In addition, a small percentage of liquid lubricant could be introduced into air line 68, if desired for installing certain hoses.

Once the opposite end of hose 20 is placed over the end 14 of coil spring 12, the air pressure on the interior spaces of hose 20 tends to inflate that hose, thereby expanding its inner diameter such that it more easily slips over the diameter of the wire of coil spring 12. The air flow between the surface of coil spring 12 and the inner diameter of hose 20 acts as a lubricant, thereby enabling a much easier installation of hose 20 upon coil spring 12. One method of running hose 20 upon the wire of coil spring 12 is to manually "grab" the outer diameter of hose 20 with a tool that looks like a wrench, but only lightly grips hose 20 with a finger member that assists in pulling hose 20 around the individual coils of coil spring 12.

As viewed in FIG. 1, hose 20 is preferably run up coil spring 12 to a point where the hose's end having the smaller diameter 22 is moved approximately one turn of the coil past the tapered end 14 of coil spring 12. Once the far end of hose 20 (i.e., the end having air fitting 70 attached to it) approaches tapered end 14 of coil spring 12, the preferred assembly procedure is to remove air fitting 70 from that end of hose 20, and then manually turn the hose 20 up coil spring 12 one or two further turns, depending upon the specific application. If a special air fitting were used having a helical shape, then that air fitting could also be designed to slip over the first turn of coil spring 12, thereby enabling air pressure to be used to assist hose 20 in being run up coil spring 12 all the way to its final position upon coil spring 12.

Once air fitting 70 is removed from the hose 20, and the hose is further run up coil spring 12 one further turn of the coil, then air cylinder 66 can be released, thereby opening the assembly fixture 60. Coil spring 12, now having hose 20 affixed in place (and thereby being the equivalent of spring assembly 10), is removed from the manual assembly fixture 60 at this time. The overall assembly procedure of this method should take well less than one minute in time duration.

Hose 20 has sufficient resiliency that one stock size of hose material may be useful in covering portions of several different springs having various wire diameter sizes. This would effectively lower the inventory costs of such hose material. In addition, it will be understood that hose 20 could be lengthened to the point where it would cover the entire length of the wire of coil spring 12. Such a construction could be used in lieu of paint or other protective covering of coil spring 12.

Figure 4:
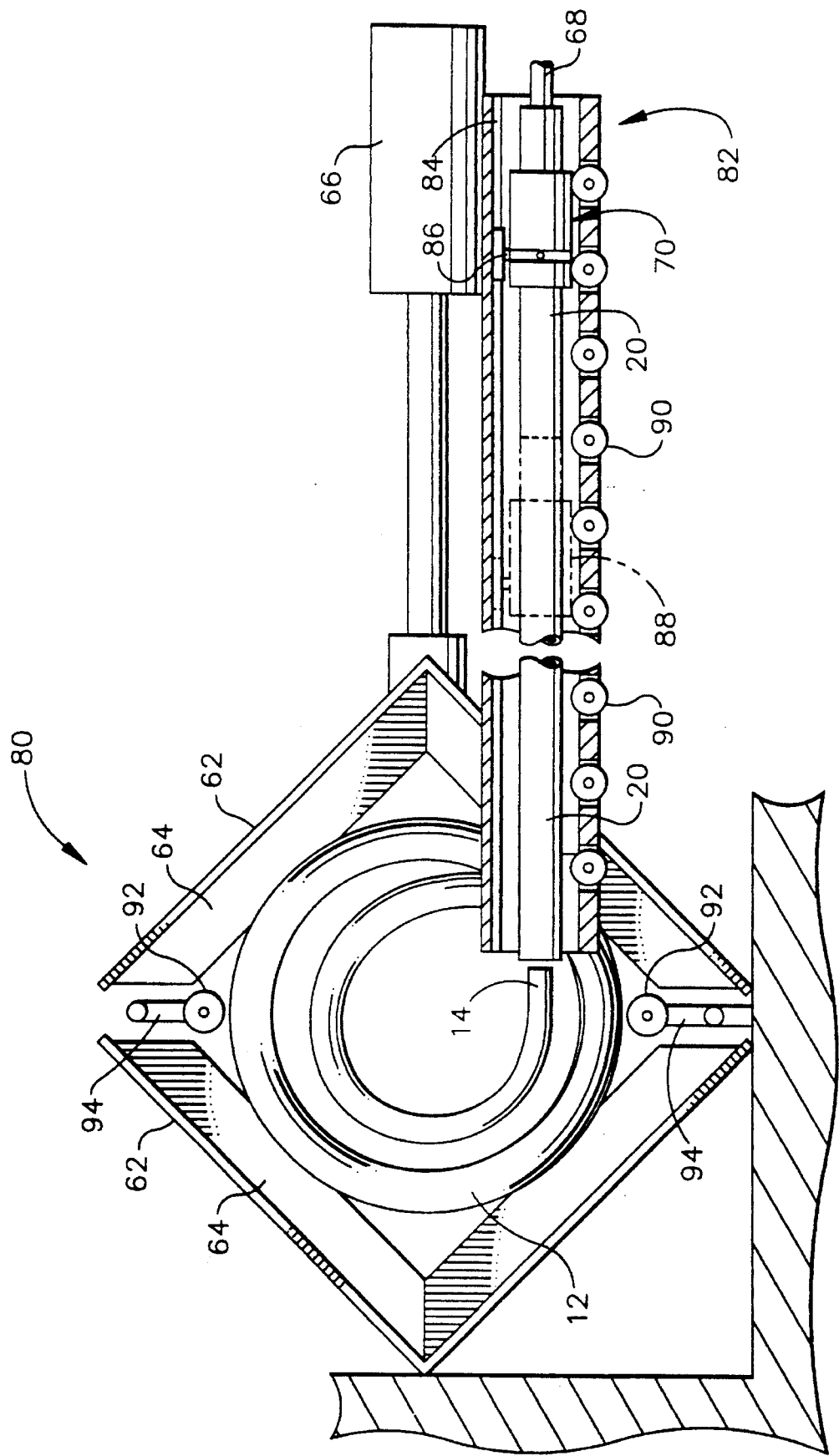
FIG. 4 is an elevational view of an automatic assembly fixture of the present invention used to assemble a hose onto a coil spring, and shown from the tapered end of the coil spring.

FIG. 4 depicts an automatic assembly fixture 80 which combines some of the same equipment depicted in FIG. 3 with a special feeder unit that will automatically insert hose 20 onto coil spring 12. Certain portions of assembly fixture 80 are retained from assembly fixture 60, such as the outer half-covers 62, the rubber linings 64, the air cylinder 66, air fitting 70, and the pressurized air line 68.

The additional features used to automate this assembly procedure include a barrel 82 which is designed to keep hose 20 captive and relatively straight as it is fed onto coil spring 12. Barrel 82 is preferably round in shape, having an inner diameter which is slightly larger than the outer diameter of hose 20 as hose 20 is non-stressed. Barrel 82 is at least as long as hose 20, and prevents hose 20 from buckling or bending as it is run onto coil spring 12. Maintaining the tubular shape of the hose tends to optimize its longitudinal rigidity, which facilitates imposition of pushing forces and prevents crimps which could reduce or block the air flow. Sets of rollers 90 can be utilized to help feed hose 20 onto coil spring 12. Rollers 90 are preferably located along the bottom of the hose, and additionally along the sides of the hose to ensure easy longitudinal movement of hose 20 along the barrel 82, and to ensure that hose 20 does not buckle. Rollers 90 can be free-wheeling, or can be driven by a motor to provide traction to help slide hose 20 onto its target coil spring 12.

Other rollers 92 can be used to help drive the hose 20 through the windings of coil spring 12. These additional rollers 92 would preferably be located such that they would tend to rub against the outer diameter of hose 20 as it passed by their location, but would not actually touch the coil spring surface 12 before hose 20 was put into those locations. Rollers 92 can be placed upon hinged supports 94, which can be made to move pivotally out of the way for insertion of coil spring 12 into assembly fixture 80, and to remove coil spring 12 (now as an assembly 10) from assembly fixture 80. Rollers 92 can additionally be spring-loaded to allow for a greater tolerance in the positioning of coil spring 12 in automatic assembly fixture 80. A large number of rollers 92 are preferably located at several angular positions along the coil of coil spring 12, to assist in pulling hose 20 along the wire of coil spring 12.

A slidable trolley or track 84 is preferably located along substantially the entire longitudinal length of the top of barrel 82. A shuttle 86 is attached to slidable trolley 84 and connects to air fitting 70. Shuttle 86 drives air fitting 70 from its beginning position at a maximum distance from the tapered end 14 of coil spring 12, toward its final position wherein air fitting 70 comes to rest adjacent to the tapered end 14 of spring 12. Shuttle 86 is capable of reciprocating along substantially the entire length of slidable trolley 84, including at all intermediate positions, such as designated by the numeral 88.

The preferred assembly procedure using automatic assembly fixture 80 comprises applying (e.g., by spraying) a silicone lubricant along the inside of both ends of hose 20, and to the coils of coil spring 12 which are to have the hose 20 installed. Coil spring 12 is placed into assembly fixture 80 such that the coils rest against rubber linings 64. At this time, air cylinder 66 is actuated to close the outer half-covers 62, thereby urging rubber linings 64 firmly against coil spring 12. A length of hose 20 is installed into the barrel 82, and air fitting 70 is placed over the end of hose 20 which is furthest from the tapered end 14 of coil spring 12. The end of hose 20 which is nearest to the tapered end 14 of coil spring 12 is either automatically or manually placed just over the tip of coil spring 12. Thereafter, shuttle 86 begins to push hose 20 onto coil spring 12 and can be assisted, either passively or actively, by rollers 90.

As hose 20 is run up the wire coils of coil spring 12, the other rollers 92 tend to actively assist in guiding the hose onto the coils. Once hose 20 is in place on coil spring 12, the air fitting 70 is removed from the end of hose 20. At this time, the hose can be manually turned one more turn onto coil spring 12, or if air fitting 70 comprises a special helical design, this final turn upon the coils of coil spring 12 can be automatic. Once hose 20 is in its desired final position upon coil spring 12, the air cylinder 66 is deactivated, thereby opening outer half-covers 62. Spring assembly 10 is now removed from automatic assembly fixture 80, and another coil spring 12 can be inserted for the next assembly procedure.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A method for assembling a hose onto the wire of a coil spring, comprising the steps of:
   (a) providing a coil spring, said coil spring comprising a wire of more than one winding, said wire having a first end and a second end, and a middle portion between said first and second ends;
   (b) placing said coil spring into an assembly fixture such that said first end of the wire of the coil spring and at least one winding of the coil spring is accessible, said at least one winding being proximal to said first end of the wire of the coil spring;
   (c) applying lubricant to said at least one winding of the coil spring;
   (d) providing a non-tapered flexible hose, said hose having a first end, a second end, and a middle portion between said first and second ends, said hose having a substantially hollow interior portion;
   (e) applying lubricant to said hollow interior portion at the first and second ends of said hose;
   (f) providing a gas fitting which is attached to a source of compressed gas;
   (g) attaching the first end of said hose to said gas fitting such that compressed gas is provided to the hollow interior of said hose; and
   (h) placing the second end of said hose over the first end of the wire of said coil spring and thereafter advancing the second end of said hose up the wire of said coil spring until the first end of said hose is telescoped over the first end of the wire of said coil spring.

2. A method for assembling a hose onto the wire of a coil spring as recited in claim 1, wherein said hose is advanced upon the wire of said coil spring by use of hand tools.

3. A method for assembling a hose onto the wire of a coil spring as recited in claim 1, wherein said gas fitting and source of compressed gas comprise an air fitting and source of compressed air, respectively.

4. A method for assembling a hose onto the wire of a coil spring as recited in claim 3, wherein said air fitting is detached from the first end of said hose, and thereafter the hose is further advanced on the wire of said coil spring approximately one further turn of the coil spring.

5. A method for assembling a hose onto the wire of a coil spring as recited in claim 3, wherein said source of compressed air provides a pressure of approximately 20 pounds per square inch.

6. A method for assembling a hose onto the wire of a coil spring as recited in claim 1, wherein said wire of the coil spring is tapered such that the diameter of its first end is smaller than the diameter of its middle portion.

7. A method for assembling a hose onto the wire of a coil spring as recited in claim 1, wherein said wire of the coil spring is non-tapered such that the diameter of its first end is substantially equal to the diameter of its second end.

8. A method for assembling a hose onto the wire of a coil spring as recited in claim 1, wherein said non-tapered hose resiliently regains its form once it has been installed upon the wire of said coil spring, such that the inner diameter of said non-tapered hose fits tightly around the diameter of said wire at both ends of said non-tapered hose.

9. A method for assembling a hose onto the wire of a coil spring as recited in claim 8, wherein said non-tapered hose comprises a Carboxylated Acrylonitrile Butadiene polymer.

10. A method for automatically assembling a hose onto the wire of a coil spring, comprising the steps of:
    (a) providing a coil spring, said coil spring comprising a wire of more than one winding, said wire having a first end and a second end;
    (b) placing said coil spring into an assembly fixture such that said first end of the wire of the coil spring and at least one winding of the coil spring is accessible, said at least one winding being proximal to said first end of the wire of the coil spring;
    (c) applying lubricant to said at least one winding of the coil spring;
    (d) providing a non-tapered flexible hose, said hose having a first end, a second end, and a middle portion between said first and second ends, said hose having a substantially hollow interior portion;
    (e) applying lubricant to said hollow interior portion adjacent the first and second ends of said hose;
    (f) providing a gas fitting which is attached to a source of compressed gas;
    (g) attaching the first end of said hose to said gas fitting such that compressed gas is provided to the hollow interior of said hose; and
    (h) placing the second end of said hose over the first end of the wire of said coil spring and thereafter advancing the second end of said hose up the wire of said coil spring until the first end of said hose is telescoped approximately one turn of the coil spring past the first end of said coil spring.

11. A method for assembling a hose onto the wire of a coil spring as recited in claim 10, further comprising the step of assisting the advancing of said hose up the wire of the spring at locations proximal to at least one of the windings of said coil spring.

* * * * *